(12) United States Patent
Seeger et al.

(10) Patent No.: US 7,840,936 B2
(45) Date of Patent: Nov. 23, 2010

(54) SUPPORT OF A PLATFORM-INDEPENDENT MODEL INCLUDING DESCRIPTIONS OF MODELING LANGUAGE ENTITIES

(75) Inventors: Frank E. Seeger, Wiesloch (DE); Ulf Fildebrandt, Oftersheim (DE)

(73) Assignee: SAP AG, Walldorf (DE)

( * ) Notice: Subject to any disclaimer, the term of this patent is extended or adjusted under 35 U.S.C. 154(b) by 1336 days.

(21) Appl. No.: 11/323,887

(22) Filed: Dec. 29, 2005

(65) Prior Publication Data

US 2007/0168932 A1 Jul. 19, 2007

(51) Int. Cl.
*G06F 9/44* (2006.01)
(52) U.S. Cl. .................. 717/105; 717/104; 717/106; 717/110
(58) Field of Classification Search .................. None
See application file for complete search history.

(56) References Cited

U.S. PATENT DOCUMENTS

| | | | | |
|---|---|---|---|---|
| RE36,422 | E * | 11/1999 | Pazel | 717/125 |
| 6,199,195 | B1 * | 3/2001 | Goodwin et al. | 717/104 |
| 6,804,686 | B1 * | 10/2004 | Stone et al. | 1/1 |
| 7,114,127 | B2 * | 9/2006 | Weitzman | 715/764 |
| 7,496,895 | B1 * | 2/2009 | Mosterman et al. | 717/124 |
| 2002/0091702 | A1 * | 7/2002 | Mullins | 707/100 |
| 2002/0108099 | A1 * | 8/2002 | Paclat | 717/102 |
| 2003/0128214 | A1 * | 7/2003 | Oglesby et al. | 345/473 |
| 2004/0044990 | A1 * | 3/2004 | Schloegel et al. | 717/113 |
| 2004/0249813 | A1 * | 12/2004 | Singh et al. | 707/9 |
| 2005/0177377 | A1 * | 8/2005 | Wright | 705/1 |
| 2005/0262485 | A1 * | 11/2005 | Plante | 717/136 |
| 2006/0004845 | A1 * | 1/2006 | Kristiansen et al. | 707/103 R |
| 2006/0064667 | A1 * | 3/2006 | Freitas | 717/104 |
| 2006/0106626 | A1 * | 5/2006 | Jeng et al. | 705/1 |
| 2006/0150148 | A1 * | 7/2006 | Beckett et al. | 717/109 |
| 2006/0168577 | A1 * | 7/2006 | Melo et al. | 717/168 |
| 2007/0028213 | A1 * | 2/2007 | D'Alo et al. | 717/120 |

\* cited by examiner

*Primary Examiner*—Jason Mitchell
(74) *Attorney, Agent, or Firm*—Fountainhead Law Group PC (57) ABSTRACT

Methods and apparatus, including computer program products, for supporting a model including descriptions of modeling language entities in a visual modeling environment. A method includes providing a visual modeling tool and modeling language entities being entities of a language of expressing applications designed in a visual modeling language environment, receiving input defining an application in the visual modeling language environment, and generating a platform-independent model of the application based on the input and the modeling language entities. In that method, the modeling language entities have a corresponding syntactic description that can be in accordance with the language, the input defines the application as a selection of the modeling language entities and a configuration of the selection, and the platform-independent model includes the selection, the configuration, and a syntactic description of the modeling language entities in the selection.

21 Claims, 6 Drawing Sheets

SUPPORT OF A PLATFORM-INDEPENDENT MODEL INCLUDING DESCRIPTIONS OF MODELING LANGUAGE ENTITIES

BACKGROUND

The present disclosure relates to data processing by a digital computer in a visual modeling environment, and more particularly to support of a platform-independent model including descriptions of modeling language entities.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

A structured approach to developing applications includes a model-driven tool such as Visual Composer, which is a visual modeling program manufactured by SAP AG of Walldorf (Baden), Germany (SAP). A tool like Visual Composer allows a developer to compose applications in a flexible way by using patterns. A pattern graphically depicts functional components (e.g., entities of a modeling language) as drag-and-drop services, and a data flow definition between them. A pattern (sometimes referred to as a UI pattern) is a configurable, reusable unit designed to let users accomplish a specific but generically-defined task, such as searching for business objects, and editing the objects that are retrieved. Generally, each pattern has a specific semantic meaning and defined interaction behavior. In some implementations, a pattern can include a predefined arrangement of UI elements. Using patterns promotes uniform design throughout an application or group of applications because similar tasks are represented and handled in the same manner. For example, a user can always search in the same way, whether searching for a sales order, a business partner, or a product. User interface patterns can be defined at various levels, and can be nested within each other, thus creating hierarchies of patterns. At the top level of the hierarchy, a pattern can act as a "floor plan" for a user interface that is designed to help end-users complete a specific business process.

A visual modeling language environment can have a separation between a designtime and a runtime version of an application. A designtime version of an application can include a combination of patterns and configuration of properties of those patterns that can define an application being developed. Underlying a designtime version of an application can be a model of the application, which can be an implementation-independent model (e.g., a model in accordance with a Universal Modeling Language (UML) specification) or a more implementation-specific model (e.g., a model in accordance with a programming language, such as the Java programming language from Sun Microsystems, Inc. of Santa Clara, Calif.). A runtime version of an application can be generated by a visual modeling program based on a designtime version of the application, with the use of a model underlying the designtime version of the application. For example, a designtime version of an application can be used to devise a model with Java classes, and, the Java classes can be compiled to generate a Java runtime version of an application.

In a designtime environment of a visual modeling environment, a tool (e.g., Visual Composer) to create a model of an application can be used. The tool and the model can be dependent on each other, as the tool understands the model. For example, the tool can understand the syntax of modeling language entities in a model of an application. For example, if an entity is a search form, the tool understands what a search form is, how it should interact with other elements in a modeling language, and how a runtime version of the entity can be generated.

SUMMARY

The present disclosure provides methods and apparatus, including computer program products, that implement techniques for supporting a platform-independent model including descriptions of modeling language entities.

In one general aspect, the techniques feature a method that includes providing a visual modeling tool and modeling language entities being entities of a language of expressing applications designed in a visual modeling language environment, receiving input defining an application in the visual modeling language environment, and generating a platform-independent model of the application based on the input and the modeling language entities. In that method, the modeling language entities have a corresponding syntactic description that can be in accordance with the language, the input defines the application as a selection of the modeling language entities and a configuration of the selection, and the platform-independent model includes the selection, the configuration, and a syntactic description of the modeling language entities in the selection.

Implementations can include one or more of the following advantageous features. The platform-independent model can further include a semantic description of the modeling language entities in the selection.

Providing can further include providing graphical modeling entities, where a graphical modeling entity is a designtime version of one or more of the modeling language entities. Generating a platform-independent model of the application can include generating an electronic file including the selection, configuration, and syntactic description.

The visual modeling tool can be a visual modeling program or one of several visual modeling tools of a visual modeling program.

The method can further include receiving a first platform-independent model of the application, and interpreting the first platform-independent model to generate a designtime or runtime version of the first platform-independent model. The platform-independent model can include a first selection of a first set of modeling language entities of a first application, a first configuration of the first selection, and a first syntactic description of the first set of modeling language entities. Interpreting to generate a designtime or runtime version of the first platform-independent model can include interpreting the first platform-independent model based on the first selection, configuration, and syntactic description.

The method can further include receiving input defining a modification to the platform-independent model of the application and generating a modified model based on the modification. The method can further include receiving input defining a modification to the platform-independent model of the application and generating a modified model based on the modification, where the input defining the modification is received in a second tool distinct from a first tool being the visual modeling tool. The second tool can be a second visual modeling tool providing a user interface for defining syntactic descriptions of the modeling language entities where the visual modeling tool inhibits a user from viewing the syntactic description of the modeling language entities.

Other aspects can include, a computer program product, tangibly embodied in an information carrier, that is operable to cause a data processing apparatus to perform operations similar to those of the method described above, and a system that includes modeling language entity means for expressing applications designed in a visual modeling language environment and visual modeling means (e.g., a visual modeling tool) for receiving input defining an application in the visual modeling language environment and for generating a platform-independent model of the application. In that system, the modeling language entity means have a corresponding syntactic description in accordance with a modeling language, the input defines the application as a selection of the modeling language entities and a configuration of the selection, and generating a platform-independent model of the application includes generating the platform-independent model based on the input and the modeling language entity means.

The subject matter described in this specification can be implemented to realize one or more of the following advantages.

Platform-independent models of applications can be generated in a visual modeling language environment with the support of a visual modeling tool. A model can be platform-independent such that interpreting the model is not dependent on a specific tool and different tools can interpret the model.

Advantageously, different tools can offer different features such that a same model can be supported without depending on the tools used. This can offer different experiences for different users working on a model of an application through different designtime tools. The difference of experience, for example through different user interfaces, can provide appropriate designtime user interfaces for appropriate types of users and improve workflow. For example, a less technically-inclined user can have a simplified user interface that allows for configuration of properties of graphical modeling entities, but does not inundate the user with features for defining syntax or semantics of modeling entities represented by the graphical modeling entities. As another example, a technically-savvy user can have a user interface allowing the user to customize syntax, semantics, or both of modeling entities, which can provide additional flexibility for defining an application. By having less technically-inclined users define applications at a higher level in one tool and having resources of technically-savvy users reserved for specific customizations in another tool, human capital can be effectively utilized and workflow for both types of users can be improved as each type of user can edit the model through their own tools.

Because a model can be platform-independent, such that the model includes descriptions of modeling language entities, the model can be ported across different visual modeling programs or versions of visual modeling programs. For example, future versions of a visual modeling program can be backwards-compatible with models of applications generated in a current version of a visual modeling program.

Models of an application can have different runtime versions because the model can be platform-independent with respect to techniques and/or mechanisms for generating a runtime version of the application. For example, in some implementations, a model of an application can be used to generate an ABAP (Advanced Business Application Programming) runtime version of the application and the same model can be used to generate a Java runtime version of the application.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
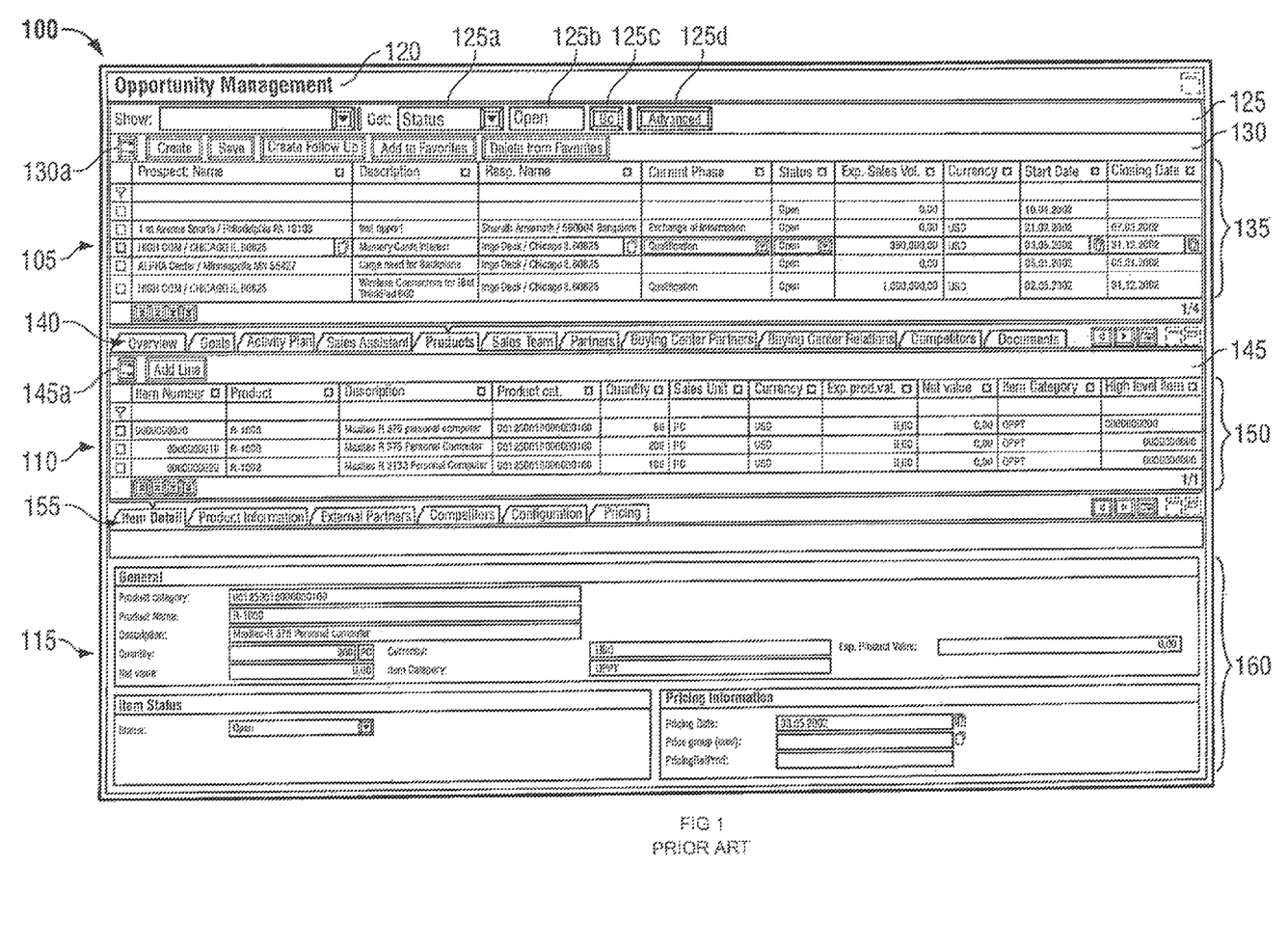
FIG. 1 is a screenshot of a user interface.

FIG. 1 illustrates a screenshot of a user interface 100. User interfaces typically contain various UI elements, including controls (e.g., drop down element 125a, text box element 125b, or button element 125c) and data elements (e.g., content area 135), arranged into application screens or views. The design of a user interface, including the layout of the UI elements and the navigation between the UI elements and between the views, is usually left up to the application developer. Thus, if the task of developing the same application is given to a number of application developers, each developer may design a different user interface for that application. Although each version of the application implements the same functionality, the user interfaces may be significantly different from each other.

As an example use of patterns, a floor plan for a user interface can specify that an application screen is to be divided into three sections, with a top section for searching for and selecting business objects, a middle section for showing the details of an object selected in the top section, and a bottom section for showing the details of a sub-object of the object in the middle section. More detailed, lower-level patterns can be used for each of the sections specified in a floor plan. For example, that a section of the screen is to include a search bar with various text entry fields and buttons at the top, and an area below the search bar where content (i.e., the content returned as a result of a search) is to be displayed. This process can continue with the definition and hierarchical nesting of even lower-level patterns.

The user interface 100 shown in FIG. 1 illustrates an example of a pattern-based user interface. The user interface 100 has a floor plan that includes an object identification pattern (OIP) 105 and two object data patterns (ODPs) 110 and 115. Object identification pattern 105 and object data patterns 110 and 115 are made up of embedded lower-level patterns, such as a data view, a form pane, a list pane, or a chart pane. Each embedded pattern can include further embedded patterns, including, for example, tool bars, tables, tab strips, and other UI pattern elements. Object identification pattern 105 is a pattern that provides an interface for searching for objects (using zero or more selected criteria), and for displaying objects found to meet those criteria. Like the floor plan pattern, OIP 105 is itself a pattern with several embedded elements. Object identification pattern 105 includes a title bar 120, a search bar 125, a tool bar 130, and a content area 135.

Figure 2:
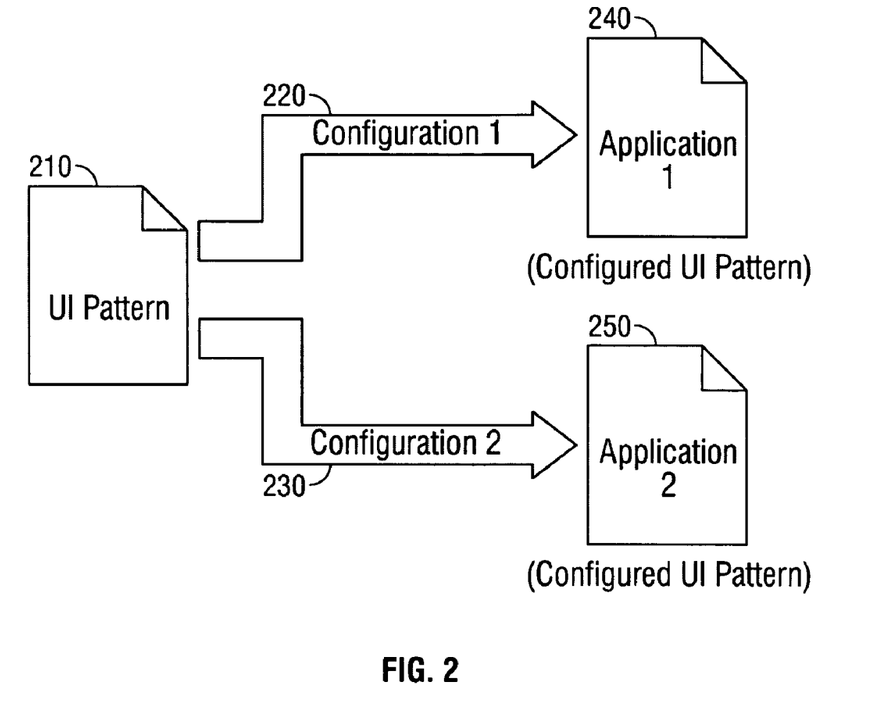
FIG. 2 is a block diagram illustrating the configuration of a UI pattern.

User interface 100 of FIG. 1 illustrates a particular application that is based on the patterns described above. Such an application can be referred to as a pattern-based application, a pattern application, or simply an application. As explained above, UI patterns are reusable user interface units designed for generic tasks—for example, an OIP pattern is designed for the task of searching for and selecting business objects stored in a back-end system (e.g., a database). In order to create a concrete user interface, e.g., user interface 100 with OIP 105, UI patterns need to be configured. FIG. 2 illustrates an example in which a UI pattern 210 is configured (shown using arrows 220 and 230) to create two UI applications 240 and 250. Configuration one 220 is used to create application one 240, and configuration two 230 is used to create application two 250.

Configuration is the process through which a UI pattern is developed into an actual user interface (or portion thereof) for an actual application. For illustrative purposes, this might be compared to instantiating an object of a specified class—the UI pattern (comparable to a class) specifies the general properties of a portion of a user interface, and a configured pattern (comparable to an instantiated object) specifies the actual properties of the portion of the user interface for an actual application. UI pattern 210 represents the general properties of the UI portion—for example, that a table is included in that UI portion, and that the location of the table is under a title bar. Configuration one 220 represents the process of specifying properties of the UI portion (for example, the specific columns that will be included in the table when the table is rendered), so as to create an application (for example, application one 240) that displays a UI with a table under the title bar with specific columns defined by configuration one 220. Similarly, application two 250 displays a table, but with specific columns as defined by configuration two 230.

A configuration can also specify what back-end systems and data are to be used for a pattern. For example, configuration one 220 can specify a particular back-end system (e.g., a local or remote database system) and a particular service to use to access the data on that back-end system that is to be displayed in the table in the UI pattern 210. Examples of services that can be used to access a host system include web services, Enterprise Java Beans (EJBs), Business Application Programming Interfaces (BAPIs) developed by SAP, and other business logic services.

As another example of a configuration, an OIP might specify that a user interface is to include a search bar at the top of the interface and a content area below the search bar. The search bar is to include a drop down box for selecting a search field, a text box for entering a query string, and a "Go" button for executing searches. Configuring such a pattern is the process of providing specifics for the pattern for an actual application. For example, to configure the OIP pattern, an application developer can specify the search fields to be included in the drop down box, the query to run when the "Go" button is pressed, the back-end system in which to run the query (i.e., the system where the actual data is located), and the columns from the returned results to display in the content area.

In some implementations, a UI pattern can have a number of predefined layouts (e.g., a grid layout and a flow layout), and the application developer can decide which of the available layouts to use as part of the configuration process. Moreover, each layout can be further configurable, providing the application developer with further configuration options (e.g., an option to create groupings of fields or other elements). In yet other implementations, a pattern can be defined to have a fully configurable layout, giving the application developer complete freedom to modify the arrangement of the elements in the pattern (e.g., by using a graphical configuration tool to specify screen positions for each element in the pattern).

Thus, the degree to which each UI pattern is configurable can vary. For example, the degree to which the arrangement of elements in a pattern can be configured can vary across a spectrum—for some patterns, the arrangement of UI elements can be fully predefined, leaving no configuration options for the application developer; for some patterns, the application developer can be given an option to choose between a handful of predefined arrangements; and for other patterns, the application developer can be given full freedom to define a custom arrangement of elements.

Other pattern properties can also be partially or fully configurable. For example, a developer can be given no options or a few options regarding the actions to be performed by a UI element in a pattern. Or the developer can be allowed to define and associate a custom action with an element in a pattern.

As can be seen from the prior discussion, the term "configuration" can be used in multiple ways. First, "configuration" is the process by which a pattern is developed into a concrete user interface (or portion thereof) for a concrete application. A "configuration" also refers to the data that is produced as a result of the configuration process—i.e., it is the set of data that defines a concrete user interface based on a pattern. Finally, "configuration" can also be used to refer to the set of options provided during the configuration process. As used in this manner, a selected option in a configuration produces a defined item of configuration data.

The use of patterns to develop applications creates two potential levels of re-use. First of all, patterns serve as re-usable building blocks for building user interfaces. For example, an OIP can be used to create two different user interfaces—a first configuration can define a user interface for searching for business objects related to customers (customer objects), and a second configuration can define a second user interface for searching for business objects related to inventory (inventory objects).

In addition, configurations can be reused, meaning that the configurations themselves can serve as re-usable building blocks for building applications. Thus, in the example above, the OIP configuration that defines a user interface for searching for customer objects can be integrated and used in two different applications (e.g., a customer relationship management application and a billing application).

The configuration of a UI pattern can be done through the use of a configuration application, such as a visual modeling program. A configuration application facilitates the process of configuring a UI pattern. In one implementation, the configuration application displays multiple configuration options for the application developer to select. The configuration options can include lists of the available back-end systems, queries, query fields, and query results.

Selections of configuration options can be stored as configuration data for a UI pattern. The configuration data can include associations between one or more of the UI elements in the UI pattern and one or more of the back-end entities to be used with the UI pattern. As an example, configuration data for the OIP described above can include a specification of the back-end system to be used, the query to be run in the back-end system, the query fields to show in the drop down box, and the result fields to display in the content area.

Configuration data can also include customization data for one or more of the UI elements in a UI pattern. Customization data can specify local changes to the business objects associated with the UI elements. For example, a drop-down menu item might be associated with a back-end query field called "UID". The customization data may specify that the "UID" field should be displayed using a more user-friendly label, for example, "reference number". Such a customization applies only to the particular UI element in the particular application being configured, and does not affect how the business object is represented in the back-end system or how the business object is represented by other UI elements in other applications that use the same UI pattern.

The configuration data can be stored in a configuration repository. In one implementation, the configuration data is stored in one or more files. Such files can be nested to reflect a hierarchical arrangement of further UI patterns. The configuration data can then be read by a pattern component, which generates the implementation of the actual user interface for the application based on the configuration data.

Figure 3:
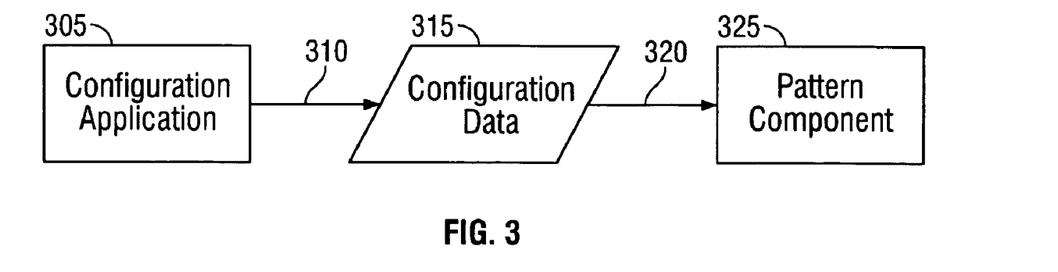
FIG. 3 is a block diagram illustrating the use of a configuration application.

FIG. 3. illustrates the use of a configuration application 305 to create 310 configuration data 315, which is combined 320 with a UI pattern component 325 to produce a pattern-based application. The configuration application 305 generates configuration data 315 that is specific to pattern component 325. That is, the configuration application 305 can ensure that a configuration schema for pattern component 325 is followed.

The generation of a pattern-based application based on a configuration can be done either immediately after the configuration has been completed, or at a subsequent point in time, such as when the pattern-based application is executed.

Figure 4:
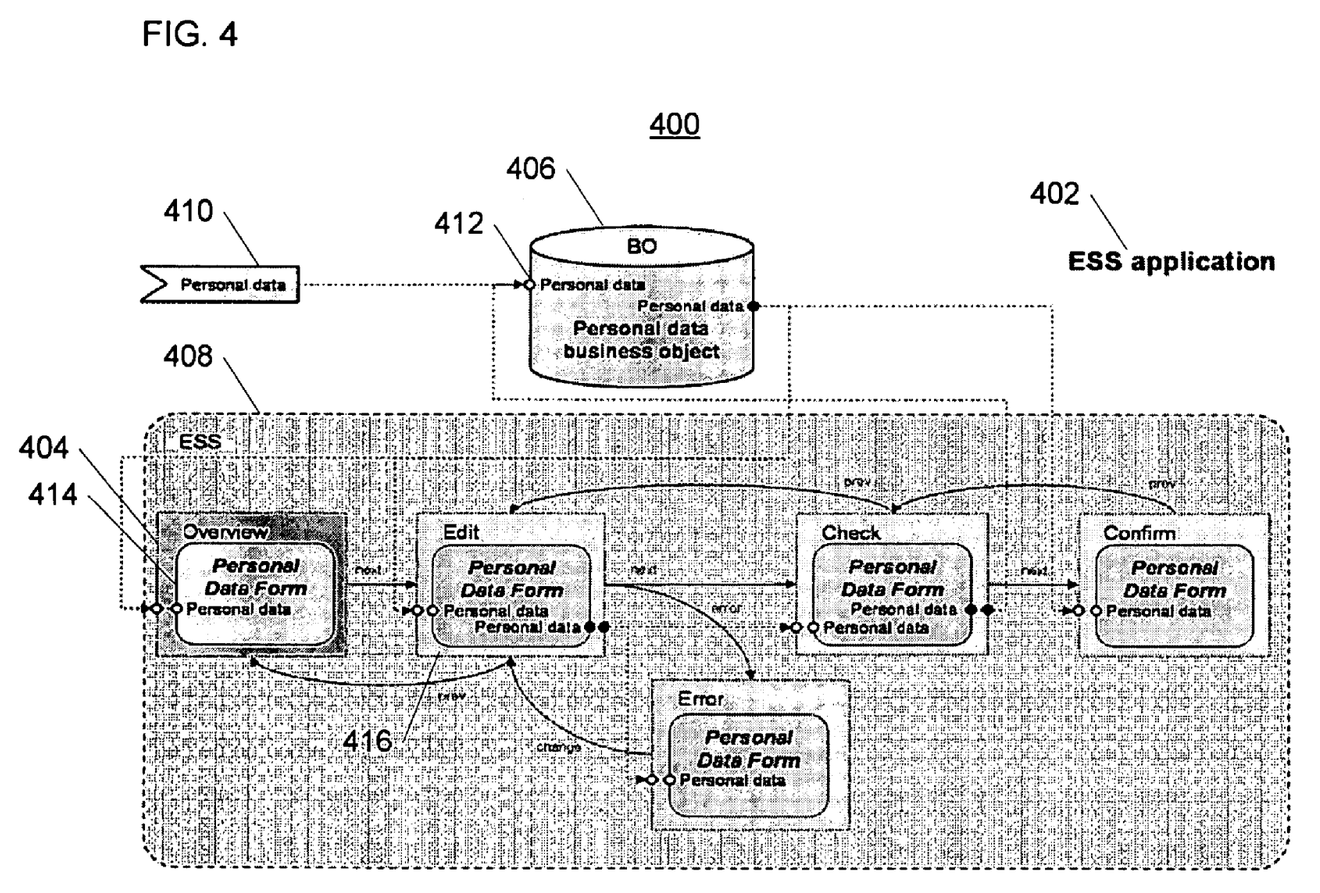
FIG. 4 is an illustration of an application being developed in a visual modeling program.

FIG. 4 is an illustration 400 of an application being developed in a visual modeling program. The illustration 400 is a graphical representation of an ESS (Employee Self-Services) application 402 in a visual modeling program. The visual modeling program allows users to generate applications based on a combination of patterns (graphical representations of entities for an application being developed). The visual modeling program includes a set of patterns that are provided to a user and define entities of a composition language. The composition language defines how applications can be developed in the visual modeling program. Thus, the base set of patterns can be considered building blocks for developing an application in the visual modeling program.

In the composition language, there are different types of entities that have different semantics and syntax, as represented by different patterns and types of patterns in a visual modeling program. The illustration 400 includes several different types of patterns, including patterns for scenarios, services, states, ports, plugs, and interactors (i.e., different patterns for different types of entities, including scenarios, services, etc.). Scenarios, such as the Overview scenario 404, are entities that represent a reusable user interface unit of an application being developed (e.g., a tab in a user interface of a web application). Services, such as the BO service 406, are entities that need not have a visual representation in an end-user application (e.g., in an application developed in the visual modeling program) and provide data to other components of an end-user application (e.g., a service that, in response to receiving a selection of personal data as search criteria, outputs personal data matching the search criteria). States, such as the ESS state 408, define visual states of a scenario by defining elements that are visible to an end-user of an application being developed (e.g., by encapsulating scenarios to be displayed). Ports, such as the Personal data port 410, can be connection points to and from entities in the modeling language (e.g., a connection point between a service and an interactor). Plugs, such as the Personal data plug 412, can be external representations of ports of a component (e.g., if the BO service 406 were drilled down, the Personal data plug 412 can be a port). Interactors, such as the Personal Data Form interactor 414, can be an atomic unit of user interaction (in the visual modeling program, such that the visual representation can not be drilled down to another level of entities), where an interactor can obtain and provide data by transforming input data into output data based on user interaction (e.g., the interaction of an end-user of an application being developed)(e.g., an interactor can be a form).

In the composition language, as reflected in a visual modeling program, the different types of entities have a different type of corresponding graphical representation. For example, interactors can have a graphical representation of a box defined by solid lines and rounded corners. As another example, a service can have a corresponding graphical representation of a cylinder.

The composition language can be defined to include certain entities that have associated semantics and syntax. For example, the composition language can be defined to include the Overview scenario 404 and the Edit scenario 416, each of which can have different semantics and different syntax, as defined by the composition language. The entities defined by the composition language can be referred to as base entities. These entities can be understood by the visual modeling program such that the visual modeling program can generate an associated runtime version of the entities. For example, by having a special generator that interprets Edit scenarios, a special generator can generate a runtime version of the Edit scenario 416.

Although certain types of entities are discussed with reference to FIG. 4, additional, different, or fewer entities can be used in a visual modeling program to represent different semantics and syntax of components of an application being developed.

Figure 5:
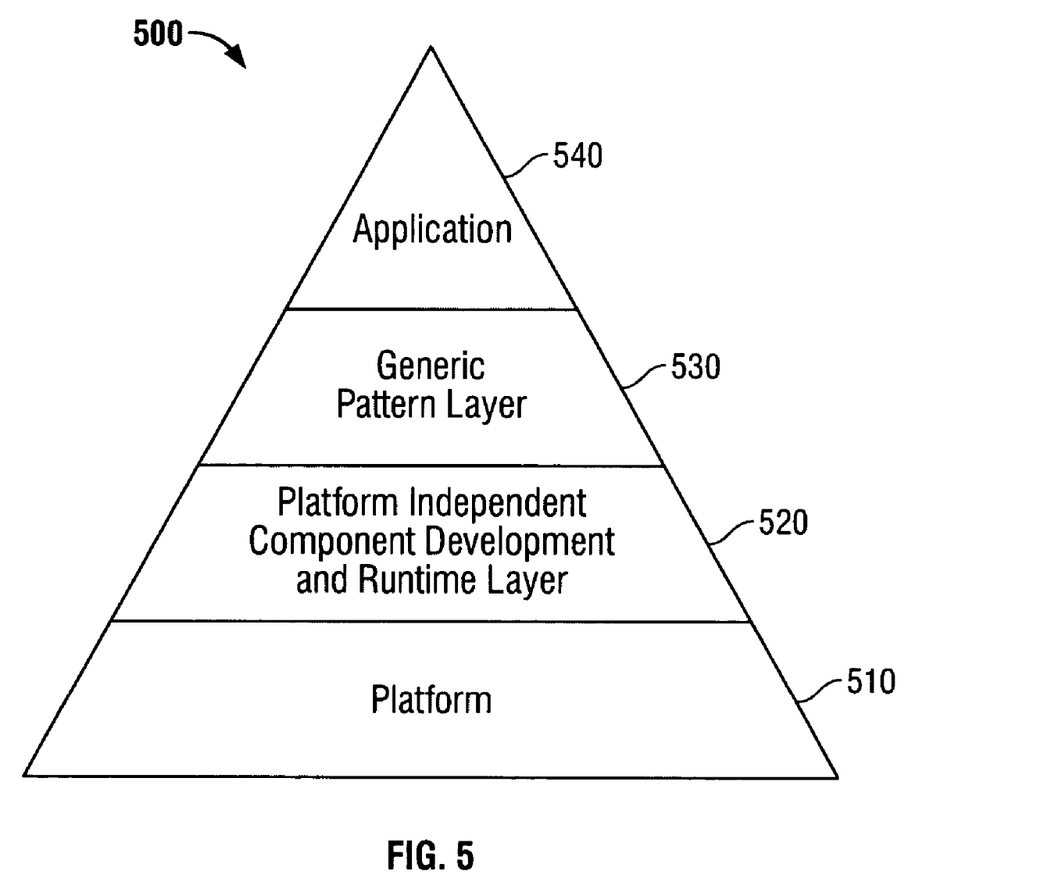
FIG. 5 is a block diagram of a framework for simplifying application development.

FIG. 5. illustrates an example framework 500 for application development based on the configuration of patterns. At the base, framework 500 includes a platform layer 510 on which applications execute. Two example platform layers 510 are the Java 2 Platform, Enterprise Edition (J2EE), manufactured by Sun Microsystems and the Advanced Business Application Programming (ABAP)-based platform manufactured by SAP. The platform layer is generally chosen (or already established) by the enterprise that executes the applications and can be referred to as the technical platform layer.

To enable applications to execute on different platform layers 510, framework 500 includes a platform independent component development and runtime layer 520. In this environment, applications can be developed using modules known as components. Components can be stored in a component repository and reused—that is, each component can have more than one instance, where the component instances are used in multiple applications, or multiple times in the same application. Components can be embedded (nested) within other components, and they can have zero or more visual representations. In one implementation, each component provides three separate interfaces—a programming interface, a data binding interface, and a visual interface. The programming interface can be used by an embedding entity (a component embedder—e.g., a higher level component, or an application) to interact with the embedded component. The visual interface can be used by a component embedder to access and use the visual representations of the embedded component (for example, to form the component embedder's own visual representation). The data binding interface can be used by the component embedder to exchange data with the embedded component.

The combination of components in the platform independent component development layer 520 can be referred to as a framework layer as it can provide a framework for interfacing between patterns in the pattern layer 530 and the technical platform in the platform layer 510. By defining this interface, the platform independent component development layer 520 can be used to define an implementation of a modeling language for a technical platform (e.g., a translation of entities of a model to runtime entities; whereas the pattern layer 530 provides designtime interfaces (e.g., patterns) for the modeling language entities).

In one implementation, platform independent layer 520 provides a framework for defining application components in a declarative and/or graphical manner, without needing to program the components for a particular platform layer 510. Platform independent layer 520 also provides interfaces, tools, services, and other features to enable the application components to execute on a specific platform layer 510. In another implementation, platform independent layer 520 additionally provides functionality to enable application components to render user interfaces on a number of different clients, with platform independent layer 520 performing the appropriate transformations for specific clients.

Building on top of platform independent layer 520, framework 500 includes a pattern layer 530 with one or more generic UI patterns. Each UI pattern is generic because it defines a particular pattern (e.g., a floor plan pattern, an OIP, an ODP, a GDP, and the like), but not the specific content that is included for a specific application that uses that pattern. The specific content for a specific application is created by configuring the pattern.

The top layer, application layer 540, contains the actual applications to be run by end-users. In this framework, an end-user application is made up of one or more configured UI patterns. In an implementation where each UI pattern includes a pattern component, an end-user application is made up of one or more configured pattern components (e.g., pattern components and their corresponding configurations). An end-user application can be stored in a configuration repository in the form of configuration data and references to the associated pattern components.

Framework 500 thus enables application developers to develop applications by configuring generic pattern components into components for specific applications (e.g., components that display the actual fields illustrated in UI 100). In one implementation, as described in more detail below, configuration data (e.g., data in a configuration repository or in one or more configuration files) is used to configure a generic pattern component into a component for a specific application. The configuration data can be defined through the use of declarative and/or graphical tools that are included, for example, in a configuration application, thus dramatically simplifying the task of developing applications. If, for example, the configuration application has access to a meta data repository that specifies the fields available for a particular back-end system for which an application is being developed, the application developer can develop an application (e.g., create a configuration) by simply choosing the fields in the meta data repository to be included (e.g., displayed) in the application.

Framework 500 can be thought of as creating a role-based programming methodology, where layers 510, 520, 530, and 540 correspond to different roles for different developers. Framework 500 is illustrated as a triangle to represent graphically that complexity and difficulty decrease for each role as one moves from the base layer to the top layer. Thus, a developer who is responsible for building and maintaining the platform independent layer 520 has the most complex and difficult job, and must be familiar with the programming languages, tools, and other intricacies of one or more platform layers 510. A developer who is responsible for building and maintaining UI patterns (e.g., configuration applications and pattern components) has a simpler job, as he or she can take advantage of the features and functionality offered by the platform independent layer 520, as described above. Finally an application developer (a developer who is responsible for developing end-user applications) has the least complex job, as he or she can create applications simply by configuring predefined UI patterns. Where the configuration process is as simple as using a configuration application to choose the desired fields from a set of available fields, the application developer may not need to have any advanced programming skills.

Figure 6:
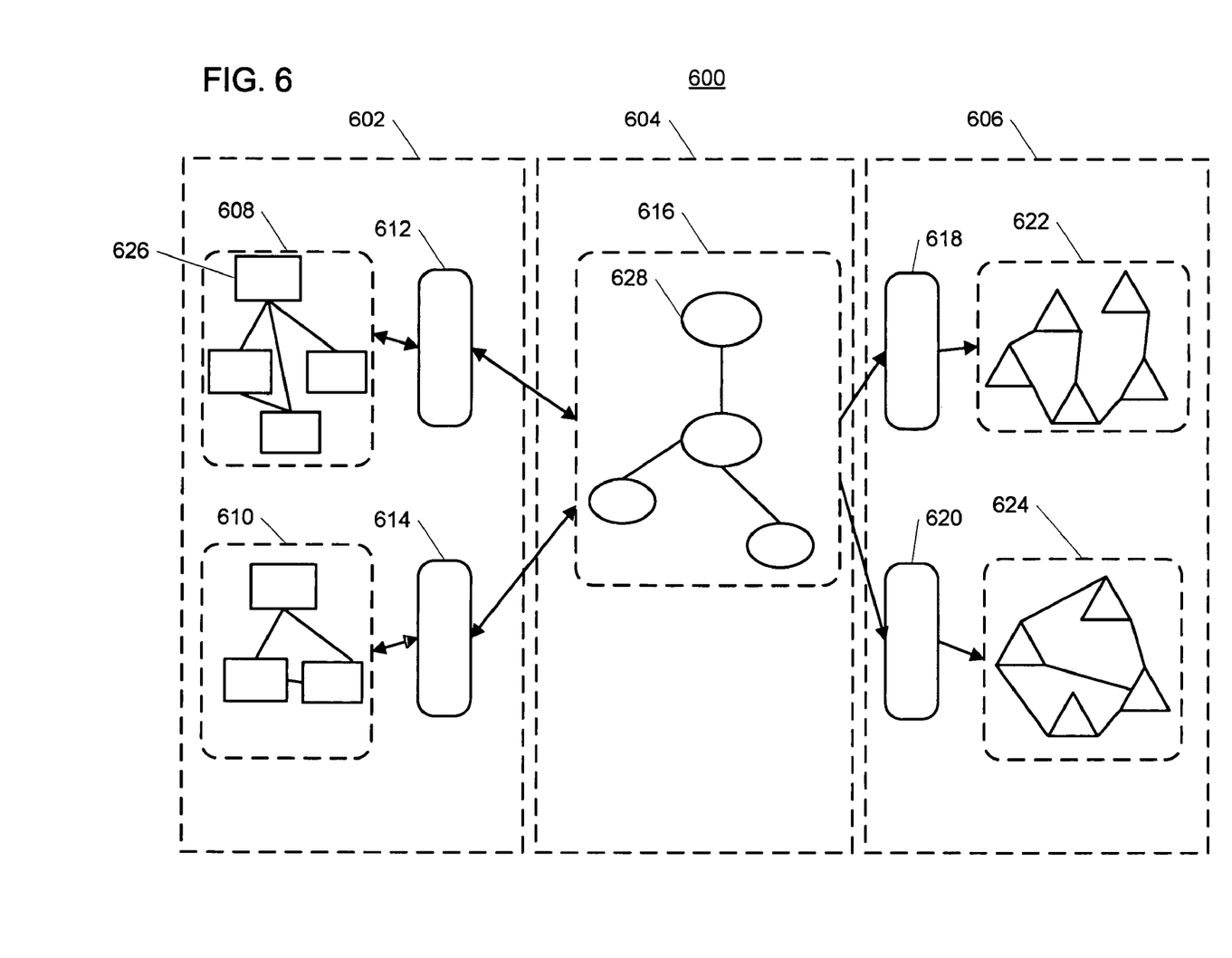
FIG. 6 is a diagram of different versions of an application in a visual modeling language environment.

FIG. 6 is a diagram 600 of different versions of an application in a visual modeling language environment. The diagram includes designtime versions of the application 608, 610 in a designtime view 602, a model of the application 616 in a model view 604, and runtime versions of the application 622, 624 in a runtime view 606.

In the diagram 600, different versions of the application are represented by different shapes, organization of shapes, and relationships between shapes. For example, designtime entities are represented by rectangles, such as the rectangle 626, whereas modeling language entities of the model are represented by ellipses, such as the ellipse 628. As another example, the first designtime version of the application 608 has a different number of rectangles and relationships between rectangles than the second designtime version of the application 610.

The diagram 600 illustrates how different tools, including different designtime tools 612, 614 and runtime generation tools 622, 624, can interact with a platform-independent model of the application 616. The tools can be part of separate programs or part of a single program, such as SAPs Visual Composer. The different tools can interact with the versions of the application differently and perform different functions. For example, the designtime tools 612, 614 are used to generate the designtime versions of the application 608, 610; receive input defining the designtime versions of the application 608, 610 and modifications to the designtime versions of the application 608, 610; and generate the model of the application 616 based on the designtime versions of the application 608, 610. As another example, the runtime generation tools 618, 620 generate runtime versions of the application 622, 624.

The versions of the application generated by the tools can differ. For example, the designtime tools 612, 614 can interpret the model of the application 616 to generate different designtime versions of the application 608, 610. As another example, the runtime generation tools 618, 620 can interpret the model of the application 616 and generate different runtime versions of the application 622, 624.

Advantageously, the different tools can offer different features such that a same model can be supported regardless of the tools used (or a tool, within a set of tools, used; e.g., some tools might not support the specific modeling language although a model is platform-independent across tools that support that modeling language). For example, the first designtime version 608 can exclude definitions of the underlying modeling language entities represented by the designtime entities, such as the designtime entity 626, in a user interface of the designtime version 608. This can reduce the complexity of the user interface of the first designtime version 608 and can make it simpler for a less-technically sophisticated user of designtime tools to generate an application. Following that example, in contrast to the features of the first designtime version 608, the second designtime version 610 can offer a user interface with complex features for editing a semantic definition of a modeling language entity underlying the designtime entity. Thus, different tools can interact with a same model of an application being developed. Different types of users can be offered different types of user interface experiences that are more tailored for a type of user. For example, because different tools can interact with a same model, an application can be initially defined by a less-technically inclined user, who can configure patterns in a tool with a simple user interface, that user can hand-off the application to a more technically-inclined user who can customize modeling language entities of the model of the application in a tool with a more complex interface and more advanced features. This can promote an efficient workflow, where technically-sophisticated users need only intervene with more complex tools in rare circumstances; whereas, users who are typically inundated by a complex user interface can regularly generate applications in a visual modeling language environment with a simple user interface.

As illustrated in the diagram 600, the platform-independent nature of the model of the application 616 can also allow for different runtime versions of an application to be developed using different runtime generation tools. This can advantageously allow for the development of platform-specific runtime generation tools, which can access a same platform-independent model of an application and generate a platform-specific runtime version of the application.

A common modeling framework is used to provide platform independence of the model of the application 616. In some implementations, a metadata API (Application Programming Interface) can be used as part of common modeling framework. The metadata API provides an interface with which a model of an application can be persisted. As the metadata API need not be bound to any tool, multiple tools can use the API to reference a persisted model. For example, different tools can be used to generate different runtime versions of an application, and each tool can use the metadata API to reference a same model of an application.

The platform-independent model of the application 616 is platform-independent in the sense that it has a degree of independence from the tools used to generate or modify the model of the application 616. The platform-independent model of the application 616 is separated from the tools by having a description of the modeling language entities included in the model of the application 616. This description is of how the modeling language should be interpreted by a modeling tool, and can directly or indirectly describe the modeling language as expressed by describing the modeling language entities (e.g., directly by describing the entities in terms of a grammar or indirectly by describing entities in terms of other entities). This description is in addition to a configuration of properties of modeling language entities. At the least, this includes a syntactic description of modeling language entities in the model of the application 616, and, can include a semantic description of modeling language entities. The descriptions of the modeling entities build on a pre-existing basic definition of a modeling language, such that the designtime version 612, 614 and runtime generation version 618, 620 have a reference point from which to interpret the modeling language entities in the model of the application 616.

For example, a text field language entity can be described in a modeling language entity as including properties defining the text to be displayed in the text field(e.g., "text field 1"), a position of the text field (e.g., 0, 0 in x,y coordinates), and size of the text field (e.g., 240 pixels wide by 240 pixels tall), and a syntactic description can define that a text field is a modeling language entity that displays text in a defined area of a display (e.g., an area of a window pane). As another example, a search field language entity can be described in a modeling language entity as including properties defining the size of the search form (e.g., 150 characters large), and a syntactic and semantic description of a generic search form (e.g., a user interface element having a defined size of text input where, upon user input a search of a database is performed and results are returned to a user in a dialog box).

The syntactic description, semantic description, or both, of modeling language entities can be made for generic types of modeling language entities, for instances of a modeling language entity in a model, or both. For example, a search form entity can be described once for a model and each instance of a search form modeling language entity in a model can have properties for a respective instance of a search form modeling language entity.

The platform-independent model of the application 616 can be independent such that different layers of a visual modeling language environment can be changed by different types of users without requiring changes to the platform-independent model of the application 616. For example, with reference to FIG. 5, an application developer at the application layer 540 can use designtime tools to design an application using patterns, and, the patterns can be edited in a tool that edits patterns of the pattern layer 530. In this manner, the visual modeling language environment can change without having to necessarily change models of an application.

The tools, such as the designtime tools 608, 610, support the platform-independent model of the application 616 by generating a model of an application that includes descriptions of the modeling language entities, interpreting models and the descriptions of their modeling language entities to generate a designtime version of an application, and supporting modification to an application such that a modified model continues to be platform-independent (e.g., by adding, removing, or changing descriptions of modeling language entities). The designtime tools 608, 610 can be different visual modeling language programs or different tools of a same visual modeling language program. For example, the designtime tools 608, 610 can be different versions of a same visual modeling language program, which, due to the platform-independent nature of models generated by the tools, can generate backward and forward compatible models of applications.

In some implementations, both the designtime tools and runtime generation tools need not support platform-independent models of an application. For example, designtime tools can support platform-independent models of an application; whereas, one runtime generation tool can support the platform-independent model of the application.

Figure 7:
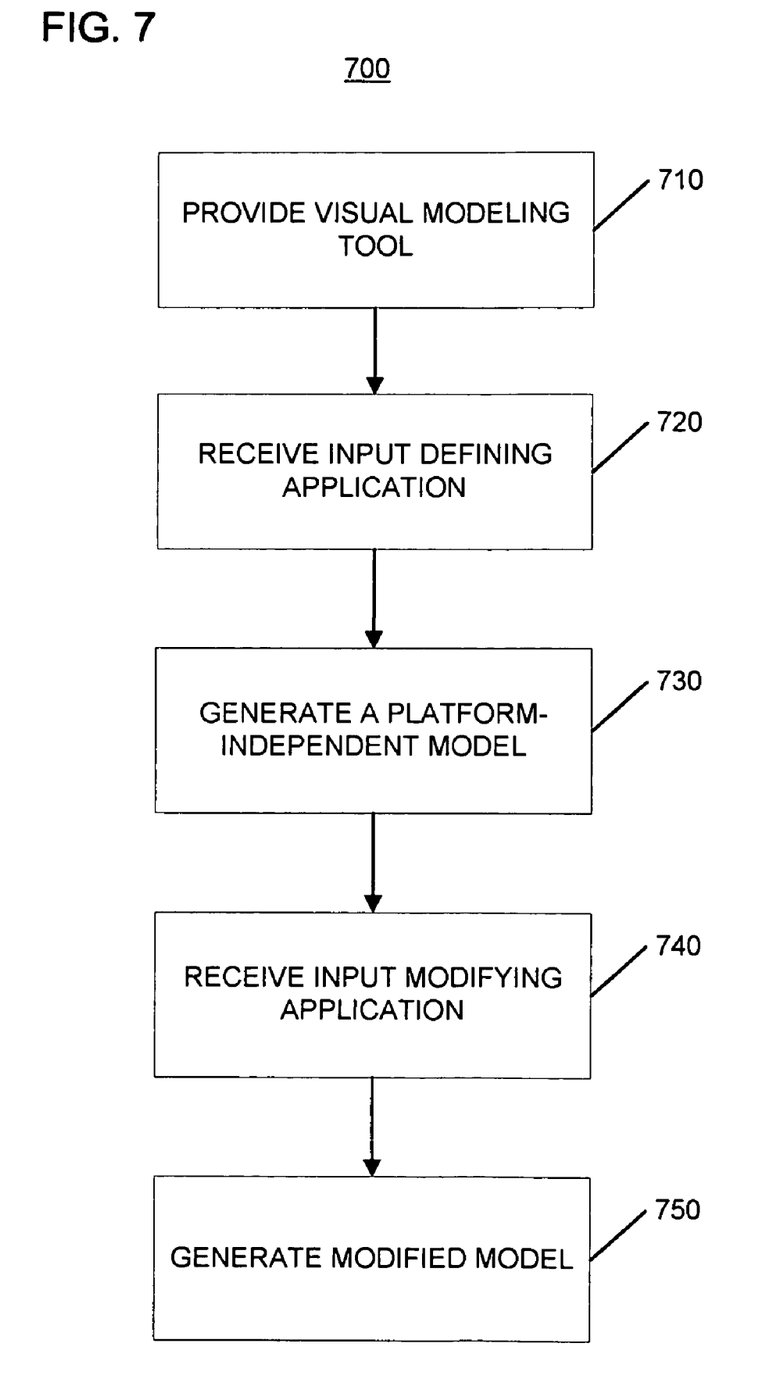
FIG. 7 is a flowchart illustrating a process of generating a platform-independent model.

FIG. 7 is a flowchart 700 illustrating a process of generating a platform-independent model. The platform-independent model contains a model version of an application, including modeling language entities, that can be supported by various designtime tools.

A visual modeling tool is provided (710). The visual modeling tool can be a visual modeling program, such as SAPs Visual Composer, or a tool of a visual modeling program. The visual modeling tool can include a designtime model editing tool that supports editing of models of applications and a runtime generation tool for generating a runtime version of an application. In some implementations, the visual modeling tool can be one of several modeling tools that can interpret a platform-independent model of an application. For example, the designtime tools 612, 614 of FIG. 6 are different designtime tools that can interpret the platform-independent model of the application 616.

The visual modeling tool can be provided with modeling language entities and graphical modeling entities, where modeling language entities are used to express entities of a modeling language in a model version of an application and have one or more associated graphical modeling entities that represent designtime versions of the modeling language entities. For example, the graphical modeling entities can be patterns in a designtime environment that can be used to represent modeling language entities in a model version of an application. The modeling language entities provided with a visual modeling tool can serve as a reference point from which other modeling language entities can be interpreted to have platform-independent models. For example, a set of modeling language entities that represent building blocks of user interface elements can be provided and other modeling language entities can be described, in terms of syntax, semantics, or both, of that set of modeling language entities. In some implementations, modeling language entities need not be described based on a set of provided modeling language entities. For example, a modeling language can have a grammar for describing modeling language entities and syntax, semantics, or both, based on modeling language entities can be described based on that grammar. In those implementations, visual modeling tools can interpret modeling language entities of a platform-independent model based on that grammar. In any case, descriptions of modeling language entities can be included in a model such that the model is independent of a specific visual modeling tool.

Received input defines an application (720). In general, the input can include a selection of graphical modeling entities and a configuration of those entities. The input can be in the form of a series of drag-and-drops of graphical modeling entities in a designtime visual modeling tool, where dragging and dropping graphical modeling entities in an area of the visual modeling tool defines that a selection of those graphical modeling entities are to be part of a designtime version of an application. The input can also include a configuration of properties of the graphical modeling entities. For example, a text field graphical modeling entity can be configured to include a specific line of text. As another example, in a WYSIWYG (what you see is what you get) visual modeling tool, the orientation and placement of user interface elements can define properties of the graphical modeling entities. The input can be user input, or input from one tool to another.

A platform-independent model is generated (730). The model is a model version of the application defined by the input (720). The model can be generated based on a selection and configuration of properties of graphical modeling entities associated with modeling language entities. Any type of mapping can be used to associate graphical modeling entities with modeling language entities, and properties of the graphical modeling language entities with properties of modeling language entities. For example, there can be a one-to-one correspondence between graphical modeling entities and modeling language entities, where a graphical modeling entity has an associated modeling language entity. The platform-independent model can be generated in one or more electronic files.

To make the model platform-independent, descriptions of modeling language entities are included with the model. The descriptions can include syntactic descriptions, semantic descriptions, or both. In general, the descriptions remove a degree of dependence between a visual modeling tool and the model. For example, by describing modeling language entities of a model in terms of a modeling language, the modeling language entities can be ported to another visual modeling tool that can use the modeling language to interpret the modeling language entities without having to understand details of the modeling language entities that might otherwise have been embedded in another visual modeling tool.

Input modifying the application is received (740). The input can be received at the visual modeling tool that received input defining the application or at another visual modeling tool, and can be used to generate a modified model of the application (750). If the input is received at another visual modeling tool, that visual modeling tool can understand the platform-independent model of the application and modify that model by understanding the modeling language used to express visual modeling language entities of the platform-independent model. For example, if a first visual modeling tool has a first grammar defining a modeling language and the second visual modeling tool understands the first grammar, the first visual modeling tool can include descriptions of modeling entities, that are included in the platform-independent model, in accordance with the modeling language and modify the platform-independent model.

The visual modeling tool that uses the input to modify the application can retain the platform-independent nature of the model of the application by including descriptions of modeling language entities. For example, if a modification adds a new modeling language entity to the platform-independent model, the visual modeling tool can add a corresponding description of the new modeling language entity, where the description is in accordance with a modeling language used by the visual modeling tool, to retain the platform-independent nature of the model.

The subject matter described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including method steps, can be performed by one or more programmable processors executing one or more computer programs to perform functions by operating on input data and generating output. The processes and logic flows can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a web browser through which a user can interact with an implementation of the subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, operations can differ and the subject matter disclosed in this specification can still achieve desirable results. For example, the operations of the flowchart illustrated in FIG. 7 can be varied such that a model is not generated before a modification of the model is made. For example, a designtime version of an application can be defined and modified before generating a model of the application. In certain implementations, multitasking and parallel processing may be preferable. Other embodiments are within the scope of the following claims

What is claimed is:

1. A computer program product, tangibly embodied in an information storage device, the computer program product being operable to cause a data processing apparatus to:
provide a visual modeling tool and modeling language entities being entities of a language for expressing applications designed in a visual modeling language environment of the visual modeling tool, wherein the modeling language entities have a corresponding syntactic description that is in accordance with the language;
receive input defining an application in the visual modeling language environment using the visual modeling tool, the input defining the application as a selection of the modeling language entities and a configuration of properties of the selection to define the application; and
generate a platform-independent model of the application based on the input and the modeling language entities, wherein the platform-independent model comprises the selection, the configuration, and a syntactic description of the modeling language entities in the selection, wherein the syntactic description describes a grammar of how the modeling language entities are to be interpreted;
wherein including the syntactic description in the platform-independent model allows different platform specific runtime versions in different languages of the application to be generated by understanding the grammar of the syntactic description included in the platform-independent model to enable the modeling language entities to execute on different platforms.

2. The computer program product of claim 1, wherein the platform-independent model further comprises a semantic description of the modeling language entities in the selection.

3. The computer program product of claim 1, wherein provide further comprises provide graphical modeling entities, a graphical modeling entity being a designtime version of one or more of the modeling language entities.

4. The computer program product of claim 1, wherein generate the platform-independent model of the application comprises generate an electronic file comprising the selection, configuration, and syntactic description.

5. The computer program product of claim 1, wherein the visual modeling tool is a visual modeling program.

6. The computer program product of claim 1, wherein the visual modeling tool is one of a plurality of visual modeling tools of a visual modeling program.

7. The computer program product of claim 1, further comprising instructions operable to:
receive the platform-independent model of the application; and
interpret the platform-independent model based on the selection, configuration, and syntactic description to generate a designtime version of the platform-independent model.

8. The computer program product of claim 1, further comprising instructions operable to
receive the platform-independent model of the application; and
interpret the platform-independent model based on the selection, configuration, and syntactic description to generate a runtime version of the platform-independent model.

9. The computer program product of claim 1, further comprising instructions operable to:

receive input defining a modification to the platform-independent model of the application; and
generate a modified model based on the modification.

10. The computer program product of claim 1, further comprising instructions operable to:
receive input defining a modification to the platform-independent model of the application, the input defining the modification being received in a second tool distinct from the visual modeling tool; and
generate a modified model based on the modification.

11. The computer program product of claim 10, wherein the second tool is a second visual modeling tool providing a user interface for defining syntactic descriptions of the modeling language entities and the visual modeling tool inhibits a user from viewing the syntactic descriptions of the modeling language entities.

12. A method comprising:
providing a visual modeling tool and modeling language entities being entities of a language for expressing applications designed in a visual modeling language environment of the visual modeling tool, wherein the modeling language entities have a corresponding syntactic description that is in accordance with the language;
receiving input defining an application in the visual modeling language environment using the visual modeling tool, the input defining the application as a selection of the modeling language entities and a configuration of properties of the selection to define the application; and
generating, by a computing device, a platform-independent model of the application based on the input and the modeling language entities, wherein the platform-independent model comprises the selection, the configuration, and a syntactic description of the modeling language entities in the selection, wherein the syntactic description describes a grammar of how the modeling language entities are to be interpreted,
wherein including the syntactic description in the platform-independent model allows different platform specific runtime versions in different languages of the application to be generated by understanding the grammar of the syntactic description included in the platform-independent model to enable the modeling language entities to execute on different platforms.

13. The method of claim 12, wherein the platform-independent model further comprises a semantic description of the modeling language entities in the selection.

14. The method of claim 12, wherein the visual modeling tool is a visual modeling program.

15. The method of claim 12, further comprising:
receiving the platform-independent model of the application; and
interpreting the platform-independent model based on the selection, configuration, and syntactic description to generate a designtime version of the platform-independent model.

16. The method of claim 12, further comprising:
receiving input defining a modification to the platform-independent model of the application, the input defining the modification being received in a second tool distinct from the visual modeling tool; and
generating a modified model based on the modification.

17. An apparatus comprising:
one or more computer processors; and
a computer-readable storage medium comprising instructions for controlling the one or more computer processors to perform a method, the method comprising:
providing a visual modeling tool and modeling language entities being entities of a language for expressing applications designed in a visual modeling language environment of the visual modeling tool, wherein the modeling language entities have a corresponding syntactic description that is in accordance with the language;
receiving input defining an application in the visual modeling language environment using the visual modeling tool, the input defining the application as a selection of the modeling language entities and a configuration of properties of the selection to define the application; and
generating, by a computing device, a platform-independent model of the application based on the input and the modeling language entities, wherein the platform-independent model comprises the selection, the configuration, and a syntactic description of the modeling language entities in the selection, wherein the syntactic description describes a grammar of how the modeling language entities are to be interpreted,
wherein including the syntactic description in the platform-independent model allows different platform specific runtime versions in different languages of the application to be generated by understanding the grammar of the syntactic description included in the platform-independent model to enable the modeling language entities to execute on different platforms.

18. The apparatus of claim 17, wherein the platform-independent model further comprises a semantic description of the modeling language entities in the selection.

19. The apparatus of claim 17, wherein the visual modeling tool is a visual modeling program.

20. The apparatus of claim 17, further comprising:
receiving the platform-independent model of the application; and
interpreting the platform-independent model based on the selection, configuration, and syntactic description to generate a designtime version of the platform-independent model.

21. The computer program product of claim 1, wherein the syntactic description describes the modeling language entities in the selection in terms of other modeling language entities.

* * * * *